United States Patent
Tao et al.

(10) Patent No.: US 12,498,735 B1
(45) Date of Patent: Dec. 16, 2025

(54) METHODS FOR ATTITUDE CONTROL OF QUADROTOR UNMANNED AERIAL VEHICLE (UAV)

(71) Applicant: GUANGDONG UNIVERSITY OF TECHNOLOGY, Guangdong (CN)

(72) Inventors: Jie Tao, Guangzhou (CN); Xinyan Li, Guangzhou (CN); Zehui Xiao, Guangzhou (CN); Xiuwei Huang, Guangzhou (CN); Jiaye Zhou, Guangzhou (CN); Renquan Lu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/204,603

(22) Filed: May 11, 2025

(30) Foreign Application Priority Data

Jun. 14, 2024 (CN) .......................... 202410767903.6

(51) Int. Cl.
| | |
|---|---|
| *G05D 1/495* | (2024.01) |
| *B64U 10/14* | (2023.01) |
| *B64U 50/20* | (2023.01) |
| *G05D 109/25* | (2024.01) |

(52) U.S. Cl.
CPC .............. *G05D 1/495* (2024.01); *B64U 10/14* (2023.01); *B64U 50/20* (2023.01); *G05D 2109/254* (2024.01)

(58) Field of Classification Search
CPC .. G05D 1/495; G05D 2109/254; B64U 10/14; B64U 50/20
USPC ............................................................. 701/4
See application file for complete search history.

(56) References Cited

U.S. PATENT DOCUMENTS

| | | | |
|---|---|---|---|
| 10,642,285 B2* | 5/2020 | Artemiadis | G05D 1/08 |
| 11,358,730 B1* | 6/2022 | Freiheit | B64D 31/06 |
| 2019/0004519 A1* | 1/2019 | Aldana Lopez | G05D 1/02 |
| 2019/0031341 A1* | 1/2019 | Gomez Gutierrez | B64U 10/10 |
| 2021/0009284 A1* | 1/2021 | Jha | B64U 30/20 |
| 2021/0247781 A1* | 8/2021 | Liu | B64U 10/14 |

FOREIGN PATENT DOCUMENTS

| | | |
|---|---|---|
| CN | 106444812 A | 2/2017 |
| CN | 106681345 A | 5/2017 |
| CN | 111580534 A | 8/2020 |
| EP | 1901153 A1 | 3/2008 |
| EP | 3889723 A1 | 10/2021 |
| JP | 2018010671 A | 1/2018 |
| KR | 102333350 B1 | 12/2021 |

OTHER PUBLICATIONS

First Office Action in Chinese Application No. 202410767903.6 mailed on Nov. 28, 2024, 15 pages.
Notification to Grant Patent Right for Invention in Chinese Application No. 202410767903.6 mailed on Jan. 9, 2025 5 pages.
Chen, Hanquan et al., Extended State Observer Design for Altitude of UAV With Multi-Sensor Data Fusion, Control Theory & Applications, 41(12): 2365-2373, 2023.

* cited by examiner

*Primary Examiner* — Tyler D Paige
(74) *Attorney, Agent, or Firm* — PORUS IP LLC (57) ABSTRACT

The present disclosure discloses a method for attitude control of a quadrotor UAV, comprising establishing an attitude dynamics model of the quadrotor UAV, establishing a motion equation and a state-space equation of a UAV control system, determining an LADRC-CFO, and establishing a differential tracker for reducing a system overshoot.

9 Claims, 1 Drawing Sheet

METHODS FOR ATTITUDE CONTROL OF QUADROTOR UNMANNED AERIAL VEHICLE (UAV)

CROSS-REFERENCE TO RELATED APPLICATIONS

This application claims priority to Chinese Patent Application No. 202410767903.6, filed on Jun. 14, 2024, the entire contents of which are hereby incorporated by reference.

TECHNICAL FIELD

The present disclosure relates to the field of unmanned aerial vehicle (UAV) technology, and in particular to a method for attitude control of a quadrotor UAV.

BACKGROUND

As an emerging aircraft category, the quadrotor aircraft has garnered extensive attention and applications due to its distinctive flight characteristics, including stable flight, high maneuverability, vertical take-off and landing (VTOL), free hovering, and operation in confined spaces. However, the design of flight control algorithms for the quadrotor aircraft remains a complex and challenging technical problem owing to the inherent nonlinearity, strong coupling, and underactuated multi-variable nature.

Currently, significant progress has been made in research on the flight control algorithms for the quadrotor aircraft, including methods such as linear quadratic regulator (LQR), adaptive control, neural network control, robust control, and nonlinear control. However, each of these methods exhibits certain limitations in practical applications.

For example, while neural network control and robust control demonstrate high control accuracy, the algorithms are complex and time-consuming, making it difficult to meet the stringent real-time requirements of the quadrotor aircraft. Similarly, although nonlinear control can achieve relatively precise control, it typically requires full-state feedback or high-precision sensors, which are often impractical in practical applications.

In recent years, active disturbance rejection control (ADRC) has attracted significant attention due to its strong robustness and disturbance rejection capability. ADRC achieves high-precision system control by observing and compensating for system disturbances in real time.

However, the application of ADRC to quadrotor aircraft control still faces several challenges. Firstly, the complex dynamics and numerous parameters of the quadrotor aircraft make ADRC parameter tuning extremely cumbersome. Secondly, conventional ADRC algorithms may be affected by noise during disturbance observation, leading to reduced observation accuracy.

As a result, improved ADRC termed linear active disturbance rejection control (LADRC) has been developed. While LADRC simplifies the parameter tuning process, the absence of a differential tracker may induce significant overshoot, adversely affecting the steady state accuracy.

Therefore, aiming at the deficiencies of the prior art, the present disclosure provides an improved active disturbance rejection method for LADRC to solve the above problems.

SUMMARY

One aspect of the present disclosure provides a method for attitude control of a quadrotor UAV, which can reduce the effect of a total disturbance on an estimation error of an observer, accurately estimate and compensate for disturbances, and enhance the robustness of the system to parameter variations and external disturbances. A method for attitude control based on LADRC-CFO is provided. In addition, in order to improve the overall performance of the control system, especially in terms of dynamic performance, steady state accuracy and disturbance rejection, and to reduce the system overshoot, a differential tracker is provided to accelerate the response speed of the system, so as to make the system reach the expected performance more quickly.

Some embodiments of the present disclosure provide a method for attitude control of a quadrotor unmanned aerial vehicle (UAV), comprising:

S1, establishing an attitude dynamics model of a quadrotor UAV;

S2, establishing a motion equation and a state-space equation of a UAV control system, and determining a linear active disturbance rejection controller with a compensation function observer (LADRC-CFO);

S3, establishing a differential tracker for reducing a system overshoot;

where in the S1, the attitude dynamics model of the quadrotor UAV is expressed as:

$$\begin{bmatrix} U_1 \\ U_2 \\ U_3 \\ U_4 \end{bmatrix} = \begin{bmatrix} C_T \sum_i^4 \Omega_i^2 \\ C_T(\Omega_1^2 + \Omega_4^2 - \Omega_2^2 - \Omega_3^2) \\ C_T(\Omega_3^2 + \Omega_4^2 - \Omega_1^2 - \Omega_2^2) \\ C_M(\Omega_2^2 + \Omega_4^2 - \Omega_3^2 - \Omega_1^2) \end{bmatrix} \quad (1)$$

where $C_T$ is a lift coefficient, $C_M$ is a drag coefficient, $U_1$ is a total lift T from a propeller driven by a motor, $U_2$, $U_3$ and $U_4$ are torques of an x-axis, a y-axis, and a z-axis;

$\Omega_i^2$ is a motor speed of each motor, i=1, 2, 3, 4;

according to Newton-Euler Equations, the attitude dynamics model of the quadrotor UAV is expressed as:

$$\begin{cases} \ddot{\phi} = \dot{\theta}\dot{\psi}\dfrac{I_y - I_z}{I_x} + \dfrac{lC_T U_2}{I_x} - \dfrac{k_x\dot{\phi}}{I_x} - \dfrac{I_R}{I_x}\dot{\theta}(-\Omega_1 - \Omega_2 + \Omega_3 + \Omega_4) \\ \ddot{\theta} = \dot{\phi}\dot{\psi}\dfrac{I_z - I_x}{I_y} + \dfrac{lC_T U_3}{I_y} - \dfrac{k_y\dot{\theta}}{I_y} - \dfrac{I_R}{I_y}\dot{\phi}(-\Omega_1 - \Omega_2 + \Omega_3 + \Omega_4) \\ \ddot{\psi} = \dot{\phi}\dot{\theta}\dfrac{I_x - I_y}{I_z} + \dfrac{lC_T U_4}{I_z} - \dfrac{k_z\dot{\psi}}{I_z} \end{cases} \quad (2)$$

where l is a distance from a body center of mass to a motor rotor, $I_R$ is a combined inertia torque of the motor rotor and the motor, $k=[k_x, k_y, k_z]^T$ is a aerodynamic drag coefficient, and $\phi$, $\theta$, $\psi$ are a roll angle, a pitch angle, and a yaw angle, respectively, $\dot{\phi}$, $\dot{\theta}$, $\dot{\psi}$ are angular velocities of a body frame about the x-axis, the y-axis, and the z-axis, respectively, $\ddot{\phi}$, $\ddot{\theta}$, $\ddot{\psi}$ are angular accelerations of the body frame about the x-axis, the y-axis, and the z-axis, respectively, $I_x$, $I_y$, $I_z$ are moments of inertia about an xx-axis, a yy-axis, and a zz-axis of the body frame, respectively;

categorizing strong coupling effects as internal disturbances $\varepsilon_i$, i=1, 2, 3;
the attitude dynamics model is expressed as:

$$\begin{cases} \ddot{\phi} = \dfrac{lC_T U_2}{I_x} - \dfrac{k_x \dot{\phi}}{I_x} + \varepsilon_1 \\ \ddot{\theta} = \dfrac{lC_T U_3}{I_y} - \dfrac{k_y \dot{\theta}}{I_y} + \varepsilon_2 \\ \ddot{\psi} = \dfrac{lC_T U_4}{I_z} - \dfrac{k_z \dot{\psi}}{I_z} + \varepsilon_3 \end{cases} \quad (3)$$

where, $$\begin{cases} \varepsilon_1 = \dfrac{I_R}{I_x}\dot{\theta}(-\Omega_1 - \Omega_2 + \Omega_3 + \Omega_4) - \dot{\theta}\dot{\psi}\dfrac{I_y - I_z}{I_x} \\ \varepsilon_2 = \dfrac{I_R}{I_y}\dot{\phi}(-\Omega_1 - \Omega_2 + \Omega_3 + \Omega_4) - \dot{\phi}\dot{\psi}\dfrac{I_z - I_x}{I_y} \\ \varepsilon_3 = \dot{\phi}\dot{\theta}\dfrac{I_y - I_x}{I_z} \end{cases} \quad (31)$$

modifying the attitude dynamics model as follows based on external disturbances:

$$\begin{cases} \ddot{\phi} = \dfrac{lC_T U_2}{I_x} - \dfrac{k_x \dot{\phi}}{I_x} + w_1 \\ \ddot{\theta} = \dfrac{lC_T U_3}{I_y} - \dfrac{k_y \dot{\theta}}{I_y} + w_2 \\ \ddot{\psi} = \dfrac{lC_T U_4}{I_z} - \dfrac{k_z \dot{\psi}}{I_z} + w_3 \end{cases} \quad (4)$$

where $w_i = \varepsilon_i + d_i$, (i=1,2,3), and $d_i$ are unknown or unmeasurable disturbances;
in the S2, an attitude dynamics equation of the quadrotor UAV is expressed as follows based on Equation (4):

$$\ddot{y} = a\dot{y} + bu + d \quad (5)$$

where y is denoted as an output of a system, u is an input of the system, d is denoted as the unknown or unmeasurable disturbances of the system, a is denoted as a parameter of the system, and b is a control gain of a second order control system;
by regarding $a\dot{y}+d$ as a total disturbance $f$ of the system, Equation (5) is expressed as:

$$\ddot{y} = bu + f \quad (6)$$

let $x_1 = y$, $x_2 = \dot{y}$, the attitude dynamics equation of the system is expressed as follows based on Equation (6):

$$\begin{cases} \dot{x}_1 = x_2 \\ \dot{x}_2 = bu + f \end{cases} \quad (7)$$

the compensation function observer adopting a compensation function with a derivative form is configured to address a non-derivative form limitation of a linear extended state observer (LESO), according to Equation (7):

$$\begin{cases} \dot{z}_1 = z_2 \\ \dot{z}_2 = L_1 e_1 + L_2 e_2 + bu \\ \hat{f} = \dot{z}_2 - bu = L_1 e_1 + L_2 e_2 \end{cases} \quad (8)$$

where $e_1 = x_1 - z_1$, $e_2 = x_2 - z_2$; $z_1$, $z_2$, and $\hat{f}$ are estimates of $x_1$, $x_2$, and $f$, respectively; $L_1$ and $L_2$ are gains of the compensation function observer;
let Equation (7) subtract Equation (8) to obtain:

$$\begin{cases} \dot{e}_1 = e_2 \\ \dot{e}_2 = -(L_1 e_1 + L_2 e_2) + f \end{cases} \quad (9)$$

according to Equation (9), a pure differential relationship between $e_1$ and $e_2$ is established and an estimation error $(e_1, e_2)$ is related to the total disturbance $f$, a compensation function $\tilde{f}$ is introduced for mitigating an effect of the total disturbance $f$ on the estimation error, resulting in:

$$\begin{cases} \dot{z}_1 = z_2 \\ \dot{z}_2 = L_1 e_1 + L_2 e_2 + \tilde{f} + bu \\ \hat{f} = L_1 e_1 + L_2 e_2 + \tilde{f} \end{cases} \quad (10)$$

by subtracting Equation (10) from Equation (7), an observation error with the compensation function $\tilde{f}$ is obtained:

$$\begin{cases} \dot{e}_1 = e_2 \\ \dot{e}_2 = -(L_1 e_1 + L_2 e_2) + (f - \tilde{f}) \end{cases} \quad (11)$$

in response to determining that the compensation function $\tilde{f}$ approaches the total disturbance $f$, the estimation error is significantly decreased;
coupling two variables with a low-pass filter to obtain:

$$\tilde{f} = \dfrac{\lambda}{s + \lambda} \hat{f} \quad (12)$$

where $\lambda = 2\pi f_c$, and $f_c$ denotes a cutoff frequency of the low-pass filter;
thus, the compensation function observer is expressed as:

$$\begin{cases} \dot{z}_1 = z_2 \\ \dot{z}_2 = L_1 e_1 + L_2 e_2 + \tilde{f} + bu \\ \hat{f} = L_1 e_1 + L_2 e_2 + \tilde{f} \\ \tilde{f} = \dfrac{\lambda}{s + \lambda} \hat{f} \end{cases} \quad (13)$$

let $z_3 = \tilde{f}$, simplifying Equation (13) to:

$$\begin{cases} \dot{z}_1 = z_2 \\ \dot{z}_2 = L_1 e_1 + L_2 e_2 + z_3 + bu \\ \dot{z}_3 = \lambda(L_1 e_1 + L_2 e_2) \\ \hat{f} = L_1 e_1 + L_2 e_2 + z_3 \end{cases} \quad (14)$$

where $\hat{f}$ denotes a compensated disturbance estimate;
a characteristic equation of the compensation function observer is derived as follows based on Equation (14):

$$s^3 + L_1 s^2 + (\lambda L_1 + L_2)s + \lambda L_2 = 0 \quad (15).$$

The technical effects achieved by some embodiments of the present disclosure include the following content.

Some embodiments of the present disclosure provide a compensation function observer (CFO) in a derivative form, which can reduce the effect of the total disturbance on the estimation error of the observer, accurately estimate and compensate for the disturbances, and enhance the robustness of the system to the parameter variations and external disturbances by introducing the compensation function. In addition, the LESO in LADRC is replaced by providing the CFO, and a method for attitude control based on LADRC-CFO is provided. Furthermore, in order to improve the overall performance of the control system, especially in terms of dynamic performance, steady state accuracy and disturbance rejection, and to reduce the system overshoot, the differential tracker is provided to accelerate the response speed of the system, so as to make the system reach the expected performance more quickly.

DETAILED DESCRIPTION

In order to make the purpose and the advantages of the present disclosure clearer and more understandable, the present disclosure is hereinafter specifically described with reference to embodiments. It should be understood that the following text is only for describing one or more specific embodiments of the present disclosure, and is not intended to strictly limit the scope of protection of the specific claims of the present disclosure.

It is understood that the terms "system," "unit," "module," and/or "block" used herein are a way to distinguish between different components, elements, sections, parts, or assemblies at different levels in an ascending order. However, the terms may be replaced by other expressions if other words accomplish the same purpose.

Figure 1:
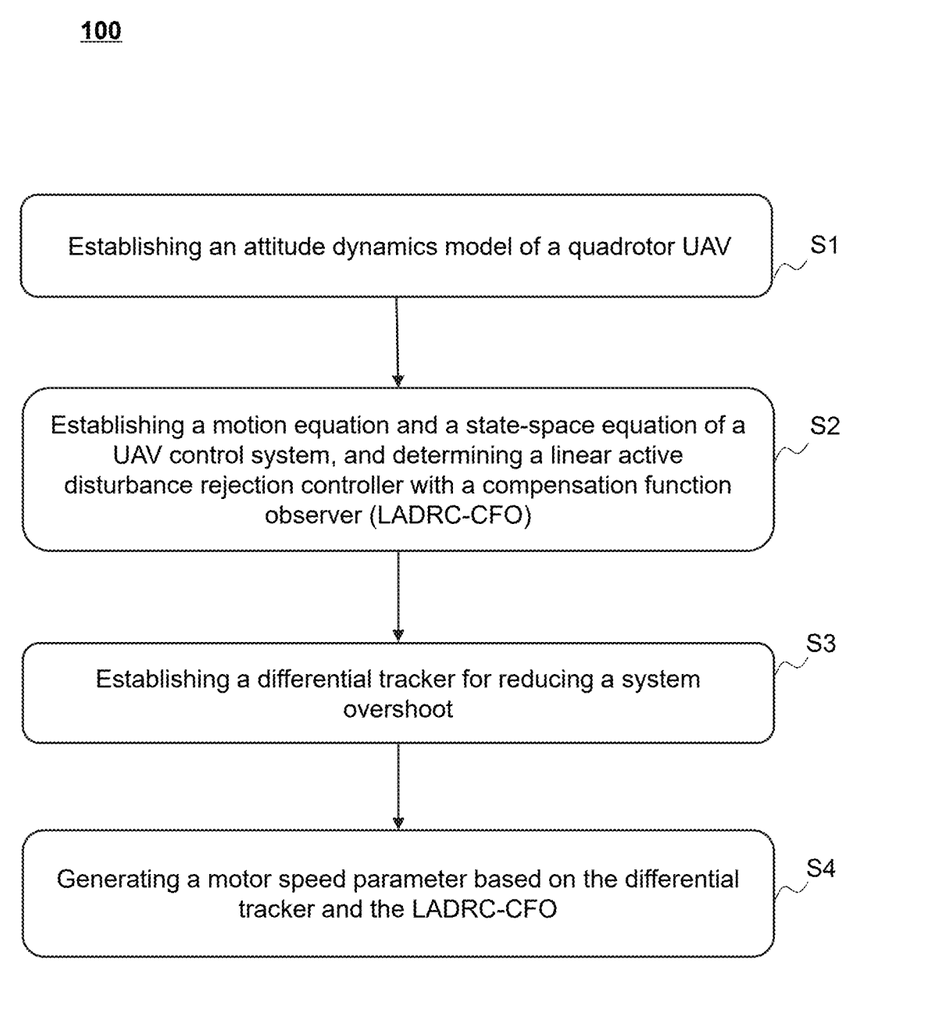
FIG. 1 is a flowchart illustrating an exemplary method for attitude control of a quadrotor UAV according to some embodiments of the present disclosure.

FIG. 1 is a flowchart illustrating an exemplary method for attitude control of a quadrotor UAV according to some embodiments of the present disclosure. In some embodiments, as shown in FIG. 1, the method for attitude control of the quadrotor UAV may be performed by a UAV control system. It should be noted that the UAV control system includes physical components and/or software systems related to the UAV. For example, the UAV control system includes a UAV body, various sensors disposed on the UAV, a processing device and/or a controller configured to implement the method described by the embodiments of the present disclosure, etc. A process 100 may include following operations.

S1: establishing an attitude dynamics model of a quadrotor UAV.

The attitude dynamics model refers to a mathematical model that describes a relationship between an attitude and dynamics of the quadrotor UAV. Power is supplied by a motor (e.g., motor thrust) of the quadrotor UAV (hereinafter referred to as the UAV). The attitude of the UAV may include flight attitudes such as a roll attitude, a pitch attitude, a yaw attitude, etc.

The roll attitude is configured to describe an attitude of the UAV rotating around an x-axis of a body frame to achieve left-right tilting. The pitch attitude is configured to describe an attitude of the UAV rotating around a y-axis of the body frame to achieve a nose-up/nose-down attitude. The yaw attitude is configured to describe an attitude of the UAV rotating around a z-axis of the body frame to achieve a heading direction variation.

The attitude of the UAV may be described by an attitude angle (e.g., a roll angle, a pitch angle, and a yaw angle), an angular velocity (e.g., a roll angular velocity, a pitch angular velocity, and a yaw angular velocity), and an angular acceleration (e.g., a roll angular acceleration, a pitch angular acceleration, and a yaw angular acceleration).

In some embodiments, the attitude of the quadrotor UAV is maintained primarily by motor speeds of four motors, and the attitude dynamics model of the UAV is expressed as:

$$\begin{bmatrix} U_1 \\ U_2 \\ U_3 \\ U_4 \end{bmatrix} = \begin{bmatrix} C_T \sum_i^4 \Omega_i^2 \\ C_T(\Omega_1^2 + \Omega_4^2 - \Omega_2^2 - \Omega_3^2) \\ C_T(\Omega_3^2 + \Omega_4^2 - \Omega_1^2 - \Omega_2^2) \\ C_M(\Omega_2^2 + \Omega_4^2 - \Omega_3^2 - \Omega_1^2) \end{bmatrix} \quad (1)$$

where $C_T$ is a lift coefficient, $C_M$ is a drag coefficient, $U_1$ is a total lift T from a propeller driven by the motor, and $U_2$, $U_3$ and $U_4$ are torques of an x-axis, a y-axis, and a z-axis, respectively;

$\Omega_i^2$ is the motor speed of each motor, i=1, 2, 3, 4.

According to Newton-Euler Equations, the attitude dynamics model of the quadrotor UAV is expressed as:

$$\begin{cases} \ddot{\phi} = \dot{\theta}\dot{\psi}\frac{I_y - I_z}{I_x} + \frac{lC_T U_2}{I_x} - \frac{k_x \dot{\phi}}{I_x} - \frac{I_R}{I_x}\dot{\theta}(-\Omega_1 - \Omega_2 + \Omega_3 + \Omega_4) \\ \ddot{\theta} = \dot{\phi}\dot{\psi}\frac{I_z - I_x}{I_y} + \frac{lC_T U_3}{I_y} - \frac{k_y \dot{\theta}}{I_y} - \frac{I_R}{I_y}\dot{\phi}(-\Omega_1 - \Omega_2 + \Omega_3 + \Omega_4) \\ \ddot{\psi} = \dot{\phi}\dot{\theta}\frac{I_x - I_y}{I_z} + \frac{lC_T U_4}{I_z} - \frac{k_z \dot{\psi}}{I_z} \end{cases} \quad (2)$$

where l is a distance from a body center of mass to a motor rotor, $I_R$ is a combined inertia torque of the motor rotor and the motor, $k=[k_x,k_y,k_z]^T$ is a aerodynamic drag coefficient, and $k_x$, $k_y$, and $k_z$ denote the aerodynamic drag coefficients of the UAV rotating around the x-axis (roll), the y-axis (pitch), and the z-axis (yaw), respectively. $\phi$, $\theta$, $\psi$ are the roll angle, the pitch angle, and the yaw angle, respectively, $\dot{\phi}$, $\dot{\theta}$, and $\dot{\psi}$ are the angular velocities of the body frame about the x-axis, the y-axis, and the z-axis, respectively, $\ddot{\phi}$, $\ddot{\theta}$, $\ddot{\psi}$ are the angular accelerations of the body frame about the x-axis, the y-axis, and the z-axis, respectively, and $I_x$, $I_y$, $I_z$ are moments of inertia about an xx-axis, a yy-axis, and a zz-axis of the body frame, respectively.

In some embodiments, the UAV control system may also establish the attitude dynamics model based on environmental monitoring data and a parameter of the quadrotor UAV.

The environmental monitoring data refers to various environmental information in a UAV flight environment, which includes data such as a temperature, a barometric pressure, a humidity, a wind speed, an altitude, etc. The environmental monitoring data may be obtained by various sensors (e.g., a temperature sensor, a barometric pressure sensor, etc.).

The parameter of the quadrotor UAV includes an intrinsic parameter of the quadrotor UAV, such as a size (e.g., a length, and a thickness), a weight, a material, or the like, of the UAV, which may be determined based on an actual condition (e.g. factory configuration information) of the UAV.

In some embodiments, the UAV control system may adjust the aerodynamic drag coefficient k based on the environmental monitoring data. For example, the aerodynamic drag coefficient may be corrected in real time based on a relationship between the aerodynamic drag coefficient and the environmental monitoring data. Merely by way of example, the aerodynamic drag coefficient is negatively correlated with environmental temperature data and positively correlated with environmental barometric pressure data.

In some embodiments, the UAV control system may adjust the moments of inertia of the body frame based on the parameter of the quadrotor UAV. For example, $I_x$, $I_y$, $I_z$ may be adjusted based on an arm length and the weight of the UAV by increasing the arm length of the UAV to increase $I_x$, selecting a motor with a relatively light mass to reduce $I_z$, or mounting a UAV component (e.g., a battery) closer to a center of the UAV to reduce $I_x$, $I_y$, etc.

In some embodiments, the UAV control system may adjust the attitude dynamics model based on the environmental monitoring data and/or the parameter of the quadrotor UAV based on Equation (2) to obtain an adjusted attitude dynamics model.

In some embodiments of the present disclosure, by considering the real-time environmental monitoring data and the parameter of the quadrotor UAV, it is possible to incorporate actual flight scenarios of the UAV, so as to make the attitude dynamics model more in line with an actual situation.

In some embodiments, the parameter of the quadrotor UAV may further include load variation information. The load variation information may be configured to reflect a variation in a load of the UAV in real time. The UAV control system may obtain the load variation information in real time based on devices such as a load pressure sensor. For example, in a flight mission where the UAV performs unmanned spraying (e.g., sprinkling of crops, spraying of pesticides, etc.), an amount of remaining liquid may be monitored by the load pressure sensor in a liquid carrying tank to obtain the load variation information of the UAV.

In some embodiments, the UAV control system may construct a wind resistance feature vector based on the environmental monitoring data and the parameter of the quadrotor UAV. The UAV control system may determine the aerodynamic drag coefficient based on the wind resistance feature vector using a vector database.

The wind resistance feature vector is configured to characterize a feature of the UAV as well as an environmental feature in a flight environment, which may be generated based on the environmental monitoring data and the parameter of the quadrotor UAV. For example, the wind resistance feature vector may be $(E_1, \ldots, E_n, P_1, \ldots, P_m)$, where $E_1, \ldots, E_n$ are the environmental features (e.g., the temperature, the humidity, the altitude, etc.) generated based on environmental monitoring data, $P_1, \ldots, P_m$ are the features (e.g., a length, a weight, a current load, etc.) of the UAV generated based on the parameter of the quadrotor UAV.

The vector database (e.g., Milvus) may include a reference wind resistance feature vector and a reference aerodynamic drag coefficient corresponding to the reference wind resistance feature vector. The reference wind resistance feature vectors and the reference aerodynamic drag coefficient corresponding to the reference wind resistance feature vector may be generated based on historical data or experimental data.

Merely by way of example, a plurality of reference wind resistance feature vectors and corresponding reference aerodynamic drag coefficients may be generated based on the UAV performing flight tests in different environments, or based on historical flight mission data.

The UAV control system may perform a vector matching process in the vector database based on a current wind resistance feature vector to determine the corresponding reference wind resistance feature vector, and determine a reference aerodynamic drag coefficient corresponding to the reference wind resistance feature vector as the aerodynamic drag coefficient. The vector matching process may be vector similarity matching or retrieval, and the matching is successful when a similarity (e.g., a vector distance) between the wind resistance feature vector and the reference wind resistance feature vector is greater than a preset threshold.

In some embodiments, the UAV control system may correct the attitude dynamics model in real time (e.g., correction of the aerodynamic drag coefficient) based on the load variation information, thereby obtaining a corrected attitude dynamics model.

A strong coupling effect of the UAV system makes a model-based (e.g., a mathematical model such as the attitude dynamics model or a mathematical process) controller design very difficult; accordingly, the strong coupling effect is categorized as an internal disturbance Et, where i=1, 2, 3.

The strong coupling effect is a relationship of nonlinear effect or influence that exists between different UAV attitudes (e.g., the roll attitude, the pitch attitude, and the yaw attitude). For example, when the attitude is adjusted by controlling the motor speeds of the four motors of the UAV, a thrust or motor speed difference between different motors may cause a variation in a roll, pitch, and/or yaw torque, leading to a disturbance in the flight attitude. Merely by way of example, when the roll torque $U_2$ is adjusted, it may change the yaw torque $U_4$ due to a variation in the motor speed of the motor.

In some embodiments, considering the internal disturbances, the attitude dynamics model is expressed as:

$$\begin{cases} \ddot{\phi} = \frac{lC_T U_2}{I_x} - \frac{k_x \dot{\phi}}{I_x} + \varepsilon_1 \\ \ddot{\theta} = \frac{lC_T U_3}{I_y} - \frac{k_y \dot{\theta}}{I_y} + \varepsilon_2 \\ \ddot{\psi} = \frac{lC_T U_4}{I_z} - \frac{k_z \dot{\psi}}{I_z} + \varepsilon_3 \end{cases} \quad (3)$$

where $\varepsilon_1$, $\varepsilon_2$, $\varepsilon_3$ respectively represent the internal disturbances affecting the roll attitude (e.g., the roll angular acceleration), the pitch attitude (e.g., the pitch angular acceleration), and the yaw attitude (e.g., the yaw angular acceleration). Where:

$$\begin{cases} \varepsilon_1 = \frac{I_R}{I_x} \dot{\theta}(-\Omega_1 - \Omega_2 + \Omega_3 + \Omega_4) - \dot{\theta}\dot{\psi}\frac{I_y - I_z}{I_x} \\ \varepsilon_2 = \frac{I_R}{I_y} \dot{\phi}(-\Omega_1 - \Omega_2 + \Omega_3 + \Omega_4) - \dot{\phi}\dot{\psi}\frac{I_z - I_x}{I_y} \\ \varepsilon_3 = \dot{\phi}\dot{\theta}\frac{I_y - I_x}{I_z} \end{cases} \quad (31)$$

In some embodiments, the attitude dynamics model is modified as follows based on external disturbances:

$$\begin{cases} \ddot{\phi} = \dfrac{lC_T U_2}{I_x} - \dfrac{k_x \dot{\phi}}{I_x} + w_1 \\ \ddot{\theta} = \dfrac{lC_T U_3}{I_y} - \dfrac{k_y \dot{\theta}}{I_y} + w_2 \\ \ddot{\psi} = \dfrac{lC_T U_4}{I_z} - \dfrac{k_z \dot{\psi}}{I_z} + w_3 \end{cases} \quad (4)$$

where $w_i = \varepsilon_i + d_i$, (i=1,2,3), $w_i$ denotes the total disturbance of the flight attitudes (e.g., the roll attitude, the pitch attitude, the yaw, etc.), $\varepsilon_i$ denotes the internal disturbance of each flight attitude, and $d_i$ denote the external disturbances such as unknown or unmeasurable disturbances of each flight attitude. The unknown or unmeasurable disturbances refer to disturbances (e.g., a turbulence, an electromagnetic interference, etc.) that are random or difficult to measure directly. In some embodiments, the external disturbances may include measurable environmental disturbances. The environmental disturbances include, but are not limited to, the temperature, the wind speed, the humidity, the altitude, or the like, of the flight environment.

S2, establishing a motion equation and a state-space equation of a UAV control system, and determining a linear active disturbance rejection controller with a compensation function observer (LADRC-CFO).

The linear active disturbance rejection controller with the compensation function observer is simplified as a compensated active disturbance rejection controller, i.e., LADRC-CFO. In some embodiments, the CFO is configured to perform disturbance estimation and suppression (e.g., noise reduction) to obtain a high-accuracy disturbance estimation result. The LADRC may generate a required control quantity based on the disturbance estimation result obtained by the CFO.

The attitude dynamics equation of the quadrotor UAV is expressed as follows based on Equation (4):

$$\ddot{y} = a\dot{y} + bu + d \quad (5)$$

where y denotes as an output of a system, u denotes an input of the system, d denotes the unknown or unmeasurable disturbances of the system, a denotes a parameter of the system, and b denotes a control gain of a second order control system. Here, the system refers to the attitude dynamics equation (e.g., Equation (5)) or a mathematical model obtained by mathematical modeling based on the equation. y denotes as the output of the system, which is a second derivative of y, denoted as $\ddot{y}$, and obtained from the equation. a, b may be coefficient matrices of the system (e.g., a preset constant matrix). The unknown or unmeasurable disturbance denoted as d represent the external disturbances during UAV flight.

In some embodiments, in addition to considering the external disturbance d, the internal disturbance $\varepsilon$ may also be considered. According to Equation (4), the attitude dynamics equation of the UAV may be expressed as:

$$\ddot{y} = a\dot{y} + bu + w \quad (51)$$

where w denotes an actual total disturbance of the system, which includes the internal disturbances $\varepsilon$ and the external unknown disturbances d during UAV flight.

In some embodiments, $a\dot{y}$ may also be regarded as a disturbance to the system.

By regarding $a\dot{y} + d$ as the total disturbance $f$ of the system, Equation (5) is expressed as:

$$\ddot{y} = bu + f \quad (6)$$

In some embodiments, according to Equation (51), $a\dot{y} + w$ is denoted as the total disturbance $f$ of the system, and Equation (51) may also be expressed as Equation (6).

let $x_1 = y$, $x_2 = \dot{y}$, the attitude dynamics equation of the system is expressed as follows based on Equation (6):

$$\begin{cases} \dot{x}_1 = x_2 \\ \dot{x}_2 = bu + f \end{cases} \quad (7)$$

where $x_1$ denotes a state variable, which is configured to express a fundamental physical quantity of the system. For example, $x_1$ may be the attitude angle (e.g., the roll angle, the pitch angle, and the yaw angle). Here, setting $x_1 = y$, indicates that the output y of the system represents the state variable corresponding to $x_1$. $x_2$ denotes the state variable, $x_2 = \dot{y}$ represents a first derivative of y or $x_1$. For example, $x_2$ denotes the first derivative of the attitude angle, which indicates that $x_2$ represents an attitude angular velocity (e.g., the roll angular velocity, the pitch angular velocity, the yaw angular velocity); $\dot{x}_2$ denotes the first derivative of $x_2$, which represents a second derivative of $x_1$, indicating an attitude angular acceleration (e.g., the roll angular acceleration, the pitch angular acceleration, and the yaw angular acceleration).

The compensation function observer adopting a compensation function in a derivative form is configured to address a non-derivative form limitation of the LESO so as to improve the accuracy of an observation value.

The LESO is an observer-based position tracking control strategy that may be used for MATLAB simulation. During a simulation process, the LESO calculates a position error and achieves position tracking by adjusting a gain of the controller.

According to Equation (7):

$$\begin{cases} \dot{z}_1 = z_2 \\ \dot{z}_2 = L_1 e_1 + L_2 e_2 + bu \\ \hat{f} = \dot{z}_2 - bu = L_1 e_1 + L_2 e_2 \end{cases} \quad (8)$$

where $e_1 = x_1 - z_1$ and $e_2 = x_2 - z_2$.

$z_1$, $z_2$, and $\hat{f}$ are estimates of $x_1$, $x_2$, and $f$, respectively; $L_1$ and $L_2$ are the gains of the compensation function observer. $e_1$ represents an estimation error between $x_1$ and a corresponding estimate $z_1$; $e_2$ denotes an estimation error between $x_2$ and a corresponding estimate $z_2$.

let Equation (7) subtract Equation (8) to obtain:

$$\begin{cases} \dot{e}_1 = e_2 \\ \dot{e}_2 = -(L_1 e_1 + L_2 e_2) + f \end{cases} \quad (9)$$

According to Equation (9), a pure differential relationship between $e_1$ and $e_2$ is introduced, which addresses error accumulation in the observer. The estimation error ($e_1$, $e_2$) is related to the total disturbance $f$, and a compensation function $\hat{f}$ is introduced for mitigating the effect of the total disturbance $f$ on the estimation error:

$$\begin{cases} \dot{z}_1 = z_2 \\ \dot{z}_2 = L_1 e_1 + L_2 e_2 + \tilde{f} + bu \\ \dot{\tilde{f}} = L_1 e_1 + L_2 e_2 + \tilde{f} \end{cases} \quad (10)$$

By subtracting Equation (10) from Equation (7), an observation error of the compensation function $\tilde{f}$ is obtained:

$$\begin{cases} \dot{e}_1 = e_2 \\ \dot{e}_2 = -(L_1 e_1 + L_2 e_2) + (f - \tilde{f}) \end{cases} \quad (11)$$

In response to determining that the compensation function $\tilde{f}$ approaches the total disturbance $f$, the estimation error is significantly decreased.

The two variables are coupled using a low-pass filter, where the two variables refer to $\hat{f}$ and $\tilde{f}$:

$$\hat{f} = \frac{\lambda}{s + \lambda} \tilde{f} \quad (12)$$

where $\lambda = 2\pi f_c$, and $f_c$ denotes a cutoff frequency of the low-pass filter.

Thus, the CFO is expressed as:

$$\begin{cases} \dot{z}_1 = z_2 \\ \dot{z}_2 = L_1 e_1 + L_2 e_2 + \tilde{f} + bu \\ \dot{\tilde{f}} = L_1 e_1 + L_2 e_2 + \tilde{f} \\ \hat{f} = \frac{\lambda}{s+\lambda} \tilde{f} \end{cases} \quad (13)$$

let $z_3 = \tilde{f}$, simplifying Equation (13) to:

$$\begin{cases} \dot{z}_1 = z_2 \\ \dot{z}_2 = L_1 e_1 + L_2 e_2 + z_3 + bu \\ \dot{z}_3 = \lambda(L_1 e_1 + L_2 e_2) \\ \hat{f} = L_1 e_1 + L_2 e_2 + z_3 \end{cases} \quad (14)$$

where $\hat{f}$ denotes a compensated disturbance estimate.

A characteristic equation of the CFO is derived as follows based on Equation (14):

$$s^3 + L_1 s^2 + (\lambda L_1 + L_2)s + \lambda L_2 = 0 \quad (15)$$

where s is a complex frequency variable after Laplace transform, Equation (14) is a time-domain expression, which is transformed into a complex domain by the Laplace transform, then a transfer function is derived, and then a characteristic Equation (10) is obtained.

According to Equation (15), the CFO is stable when all roots of the characteristic equation lie in a left half plane. The CFO is estimable, and the CFO has the ability to compensate for the disturbances, which in turn satisfies a control demand by using a PD observer. A control quantity u is designed as follows based on the CFO and the PD controller:

$$\begin{cases} u_0 = k_p(u_d - z_1) - k_d(\dot{u}_d - z_2) + \ddot{u}_d \\ u = \frac{u_0 - \hat{f}}{b} \end{cases} \quad (16)$$

where $u_d$ is an expected input, $u_0$ is an output value of the PD controller, $k_p$, $k_d$ are controller parameters of the PD controller. $\ddot{u}_d$ is a second derivative of the expected input $u_d$, and $\dot{u}_d$ is a first derivative.

S3, establishing a differential tracker for reducing a system overshoot.

The system overshoot is a maximum magnitude by which the output of the system exceeds a steady state value for the first time before reaching the steady state value. Reducing the system overshoot allows the UAV to make a smooth transition in reaching the steady state value. The system herein refers to a UAV system with the LADRC-CFO. In some embodiments, and the differential tracker may be configured to improve the performance of the UAV system with the LADRC-CFO. The differential tracker is expressed as:

$$\begin{cases} r_1(k+1) = r_1(k) + r_2(k) * T \\ r_2(k+1) = r_2(k) + fhan(u_d(k), r_1(k), r_2(k), g, h) * T \end{cases} \quad (17)$$

where $u_d(k)$ is the expected input (e.g., the attitude angle (e.g., the roll angle)), T is a sampling period, g>0 is a speed factor, $r_1(k)$ is a tracking signal of an initial signal, $r_2(k)$ is a derivative of the tracking signal, and fhan( ) is a time-optimal control synthesis function.

An attitude control law is expressed as follows based on Equation (17):

$$\begin{cases} u_0 = k_p(r_1 - z_1) - k_p(r_2 - z_2) + \ddot{u}_d \\ u = \frac{u_0 - \hat{f}}{b} \end{cases} \quad (18)$$

In some embodiments, the UAV control system may obtain attitude data based on an attitude sensor; obtain an actual system overshoot based on the attitude data; in response to determining that the actual system overshoot does not satisfy a steady state condition: update a first model parameter and a second model parameter based on the actual system overshoot.

In some embodiments, the first model parameter may include the gains $L_1$ and $L_2$ of the CFO, and the controller parameters $k_p$ and $k_d$ of the PD controller. The second model parameter may include the speed factor g and the sampling period T. The UAV control system may, during a plurality of attitude adjustments of the UAV, record the attitude data and the actual system overshoot corresponding to each adjustment, and update the first model parameter and the second model parameter based on the actual system overshoot and the steady state condition.

The attitude sensor may be various sensing devices (e.g., a gyroscope, an accelerometer, and other devices) capable of monitoring the attitude of the UAV, which may be configured to obtain real-time attitude data of the UAV. The attitude data may be configured to reflect a real-time flight state of the UAV after each attitude adjustment. For example, the attitude data may include a roll angle, a roll angular velocity, and/or a roll angular acceleration before and after a roll attitude adjustment. The attitude data may further include the system overshoot during the adjustment.

The steady state condition is a condition under which the UAV control system controls the attitude of the UAV to achieve an expected attitude (e.g., the roll, the pitch, and the yaw) and maintain a steady state. In some embodiments, the actual system overshoot not satisfying the steady state condition may include that a count of times that the system overshoot is greater than a first overshoot threshold during a preset time period is greater than a preset count threshold. The first overshoot threshold may be a preset percentage (e.g., 5%) greater than the expected attitude. The preset time period (e.g., 10 min) and the preset count threshold (e.g., 10 times) may be determined according to actual needs (e.g., a flight mission, and a flight environment).

It should be noted that the steady state condition may include the steady state condition corresponding to various expected attitudes, such as the roll angle $\phi$, the pitch angle $\theta$, and the yaw angle $\psi$. When the UAV control system adjusts a current attitude of the UAV to the expected attitude through the output of the controller based on the plurality of adjustments, the system overshoot may cause an oscillation (i.e., instability) in the UAV flight.

In some embodiments, in response to determining that the actual system overshoot does not satisfy the steady state condition, the UAV control system may update the gain $L_1$ of the CFO in the first model parameter to adjust a tracking speed of the CFO for a disturbance error. In some embodiments, the UAV control system may update the gain $L_2$ of the CFO in the first model parameter to adjust a dynamic response capability of the CFO for the disturbance estimate. For example, the gain $L_1$ and/or the gain $L_2$ may be increased, and an increase magnitude may be positively correlated with a size of the actual system overshoot. Merely by way of example, the larger the actual system overshoot, the greater the increase magnitude of $L_1$ and/or $L_2$, so as to improve the speed and accuracy of the disturbance estimate.

In some embodiments of the present disclosure, by adjusting $L_1$ and $L_2$, the efficiency and accuracy of the disturbance estimate $f$ can be improved, thereby providing a reliable basis for subsequent attitude adjustment.

In some embodiments, the UAV control system may update the controller parameter $k_p$ to adjust a response speed to an attitude error (e.g., a difference between an initial roll angle and an expected roll angle). For example, increasing the $k_p$ may accelerate the response speed to the attitude error, thereby quickly reducing the attitude error. In some embodiments, the UAV control system may update the controller parameter $k_d$ to adjust a variation rate of the attitude error. For example, increasing ka may slow down the variation rate of the attitude error and avoid an overshoot caused by quick adjustment.

In some embodiments of the present disclosure, the adjustment of the first model parameter enhances the precision and efficiency of the attitude adjustment of the UAV from the current attitude to the expected attitude, makes the process of the adjustment smoother, and avoids the oscillation or the overshoot caused by quick adjustment.

In some embodiments, in response to determining that the actual system overshoot does not satisfy the steady state condition, the UAV control system may update the speed factor g and the sampling period T in the second model parameter to optimize the differential tracker. In some embodiments, an increase magnitude of the speed factor g may be positively correlated with the actual system overshoot, and a size of the sampling period T may be negatively correlated with the actual system overshoot. For example, when the actual system overshoot increases, the speed factor g may be increased to accelerate the tracking of the initial signal $r_1(k)$; or the sampling period T may be reduced to improve the accuracy of the differential signal $r_2$.

In some embodiments of the present disclosure, by adjusting the second model parameter, the smoothness of the signal tracking by the differential tracker can be improved by the adjustment of the speed factor g. By the adjustment of the sampling period T, the accuracy and computational load of the signal tracking can be balanced.

In some embodiments, in response to determining that the actual system overshoot does not satisfy the steady state condition, the UAV control system may obtain candidate control parameters; determine, based on the candidate control parameters, the environmental monitoring data, and flight mission information, a control score for each of the candidate control parameters through a control prediction model; obtain a target first model parameter and a target second model parameter by updating the first model parameter and the second model parameter based on the control score. More descriptions regarding the environmental monitoring data may be found in S1 and the related descriptions thereof.

The candidate control parameters may include a candidate first parameter and a candidate second parameter. The candidate first parameter may include the gain $L_1$ and the gain $L_2$ of the CFO in the first model parameter, the controller parameter $k_p$, and the controller parameter $k_d$ of the PD controller, or any combination thereof. The candidate second parameter may include the speed factor g and the sampling period T, or any combination thereof.

The flight mission information refers to information corresponding to a mission that the UAV needs to perform. The flight mission information may include a mission type (e.g., logistics and transportation, aerial photography, search and rescue and inspection, pesticide spraying, etc.), flight route information (e.g., a UAV flight route, a location of a region involved in the flight route, information about a regional topography, regional weather, etc.), and load information (e.g., information about a weight of the loaded materials, pesticides, etc.). The flight mission information may be determined based on an actual mission situation, and the environmental monitoring data may be determined based on an actual environmental situation at the time of performing the flight mission.

In some embodiments, the UAV control system may select the candidate control parameters based on the flight mission information. Merely by way of example, in a strong wind environment, larger gains $L_1$ and $L_2$ of the CFO may be selected to improve the efficiency and accuracy of the disturbance estimate for strong winds. As another example, for the load mission, $k_p$ and $k_d$ may be selected to optimize the variation rate of the attitude error, thereby avoiding the overshoot or the oscillation of the attitude adjustment of the UAV due to a load variation of the UAV.

The control prediction model refers to a model used to determine the control score for the candidate first parameter and the candidate second parameter. In some embodiments, the control prediction model may be a trained machine learning model. For example, the control prediction model may be a neural network (NN) model.

An input of the control prediction model may include the candidate control parameters, the environmental monitoring data, and the flight mission information, and an output of the control prediction model may include the control score for each of the candidate control parameters. Merely by way of example, the input of the control prediction model includes the controller parameter $k_p$ and the controller parameter $k_d$ of the PD controller, the environmental monitoring data and the flight mission information, and the output of the control prediction model includes the control score corresponding to the controller parameter $k_p$ and the controller parameter $k_d$, respectively.

In some embodiments, the control prediction model may be obtained by training based on a training sample set. The training sample set includes a plurality sets of training samples and labels corresponding the training samples. Each set of the plurality sets of training samples includes sample candidate control parameters, sample environmental monitoring data, and sample flight mission information, and each label is an actual control score corresponding to each of the training samples.

The training sample set may be obtained based on historical data corresponding to a historical flight mission. For example, a training sample may be generated based on the mission type, the flight route information, the load information, the environmental monitoring data during a certain historical flight mission, and the control parameters used in the historical flight mission, and the actual control score corresponding to the training sample may be used as the label of the training sample. The label may be labeled based on manual annotation or other ways. The training sample set is generated based on a plurality of training samples constructed from a plurality of historical flight missions.

The actual control score corresponding to the training sample may be determined based on an actual control effects of this historical flight mission. The actual control effect may include but is not limited to a duration for the UAV to reach a steady state, the overshoot, an oscillation frequency, and energy consumption (e.g., power consumption of the motor), which is determined based on a historical real-time overshoot record. The duration for the UAV to reach the steady state, the overshoot, the oscillation frequency, and the energy consumption may be negatively correlated with the actual control score. For example, the longer the duration for the UAV to reach the steady state, the lower the actual control score; the shorter the duration for the UAV to reach the steady state, the higher the actual control score.

In some embodiments, the actual control score corresponding to the training sample may be determined based on weighted summation of the duration for the UAV to reach the steady state, the overshoot, the oscillation frequency, and the energy consumption. A weight may be determined based on a specific flight mission or a flight scenario. Merely by way of example, for an aerial photography mission, the weights of the overshoot and the oscillation frequency may be set larger; and for a logistics mission, the weights corresponding to the duration for the UAV to reach the steady state and the energy consumption may be set larger.

In some embodiments, during the training, a value of a loss function may be determined based on a difference between an output of an initial model and the label. Parameters of the initial model may be iteratively updated based on the value of the loss function until a training termination condition is met (e.g., the loss function converges, a specific count of iterations are performed, etc.). An updated initial model may be used as a trained control prediction model.

In some embodiments, the training of the control prediction model may be phased training. The phased training may include a first training phase, a second training phase, and a third training phase, and the training sample set corresponding to the first training phase, the second training phase, and the third training phase may be different. The phased training may be related to a mission difficulty corresponding to a sample flight mission.

The mission difficulty corresponding to the flight mission reflects a degree of difficulty in completing the flight mission. The mission difficulty may be determined by evaluating the environmental monitoring data and the flight route during execution of the flight mission. For example, the mission difficulty may be set higher for the presence of a strong wind interference, rainy days, a high altitude, etc. As another example, the mission difficulty may be set higher when a count of obstacles in a region covered by the flight route is relatively high or the complexity of the flight route (e.g., a count of turns, etc.) is significant. The UAV control system may determine the mission difficulty corresponding to the flight mission based on the environmental monitoring data and the flight mission information. For example, the mission difficulty may be set to a low difficulty, a medium difficulty, a high difficulty, etc.

In some embodiments, the first training phase, the second training phase, and the third training phase may be determined based on a sample mission difficulty corresponding to the sample flight mission. For example, the first training phase, the second training phase, and the third training phase correspond to the training conducted for the sample flight mission at the low difficulty, the medium difficulty, and the high difficulty, respectively. The training sample set used for the first training phase, the second training phase, and the third training phase may be different.

In some embodiments, the UAV control system may obtain the plurality of historical flight missions and group the plurality of historical flight missions to obtain a low difficulty mission group, a medium difficulty mission group, and a high difficulty mission group, and construct a first training sample set for the first training phase, a second training sample set for the second training phase, and a third training sample set for the third training phase based on the historical data of the low difficulty mission group, the medium difficulty mission group, and the high difficulty mission group, respectively, and then perform iterative training based on the first training sample set, the second training sample set, and the third training sample set in turn.

In some embodiments, the UAV control system may set a first learning rate, a second learning rate, and a third learning rate corresponding to the first training phase, the second training phase, and the third training phase, respectively. Considering that the mission difficulty of the sample flight mission corresponding to the first training phase, the second training phase, and the third training phase increases in sequence, the first learning rate, the second learning rate, and the third learning rate may increase in sequence. For example, for the first training phase, a lower learning rate may be set to improve the training efficiency. For the third training phase, a large set of training samples targeting high difficult flight missions may be used for training, making the model estimate the control effect in a complex terrain, a complex route, and a complex environment.

In some embodiments, in the first training phase, an initial control prediction model may be trained based on the first training sample set to obtain a first control prediction model; in the second training phase, the first control prediction model obtained in the first training phase may be trained based on the second training sample set to obtain a second control prediction model; in the third training phase, the second control prediction model obtained in the second training phase may be trained based on the third training sample set to obtain the trained control prediction model, In practical applications, the control score for each of the candidate control parameters may be determined using the control prediction model.

In some embodiments, the higher the actual control score corresponding to the control parameter, the better the control effect, and the lower the actual control score, the worse the control effect (e.g., too much overshoot, frequent oscillations, longer duration to reach the expected attitude, etc.).

Accordingly, the UAV control system may determine the first model parameter and the second model parameter included in the candidate control parameter with the highest control score as an updated first model parameter and an updated second model parameter.

In some embodiments of the present disclosure, learning of the relationship between the adjustment of the candidate control parameters and the environmental monitoring data and the flight mission information can be realized through the control prediction model, so as to make the adjustment of the first model parameter and the second model parameter more quickly. In addition, considering different flight missions and corresponding environmental information makes predicted control scores more consistent with actual situations, which in turn makes the optimization of the first model parameter and the second model parameter more accurate.

In some embodiments, the UAV control system may determine a flight influence factor based on the sample environmental monitoring data and the sample flight mission information; determine the preset count threshold based on the flight influence factor; and in response to determining that a count of consecutive updates of the first model parameter and the second model parameter is greater than the preset count threshold, generate a flight termination instruction and transmit the flight termination instruction to the motor to execute a grounding operation of the quadrotor UAV.

In some embodiments, the UAV control system may determine corresponding environmental information such as the temperature, the barometric pressure, the humidity, the wind speed, and the altitude, as well as the flight mission information such as the mission type and the flight route information from the sample environmental monitoring data and the sample flight mission information, and determine the flight influence factor (e.g., the strong winds, the rainy days, the complex terrain, etc.). More descriptions regarding the flight influence factor may be found elsewhere in the present disclosure.

The preset count threshold is a count of times required to adjust to the expected attitude, which may be a preset value based on experience. In some embodiments, the flight influence factor may include the mission difficulty of the flight mission. For example, for a low difficulty flight mission, the corresponding preset count threshold may be set to a relatively low value. For example, for a high difficulty flight mission, the corresponding preset count threshold may be set to a relatively high value.

When the count of consecutive updates of the first model parameter and the second model parameter is greater than the preset count threshold, it reflects a possible malfunction of the UAV. The UAV control system may generate the flight termination instruction and transmit the flight termination instruction to the motor to execute a grounding operation of the quadrotor UAV, and may also issue a warning and instruct the UAV to fly to the nearest maintenance point.

In some embodiments, the process 100 may include the following operations.

S4, generating a motor speed parameter based on the differential tracker and the LADRC-CFO.

The motor speed parameter may be configured to adjust the motor speed of the motors of the UAV, which in turn adjusts the attitude of the UAV.

In some embodiments, after obtaining the actual control input u, which is the output value $u_0$ of the PD controller compensated for disturbance through the compensated active disturbance rejection controller and the differential tracker, the UAV control system may obtain the motor speed parameter using Equation (1) based on the expected attitude of the UAV and the distribution of the motors.

The expected attitude may include the roll attitude, the pitch attitude, the yaw attitude, or any combination thereof. The expected attitude may be determined based on the actual situation. For example, the expected attitude may involve flying with a specific roll angle in a certain direction (e.g., rolling to the right). The distribution of the motors may include a position relationship of different motors. For example, the four motors of the UAV may be symmetrically distributed on both sides of the body frame. For example, among the four symmetrically distributed motors of the UAV, the motor $M_1$ and the motor $M_3$ may be located on one side (e.g., a left side) of the body frame, and the motor $M_2$ and the motor $M_4$ may be located on the other side (e.g., a right side) of the body frame.

If the expected attitude requires only the roll attitude (e.g., rolling to the right side of the UAV), the motor speed of the motors on the left side (e.g., $M_1$ and/or $M_4$) may be increased and the motor speed of the motors on the right side (e.g., $M_2$ and/or $M_3$) may be decreased, thereby achieving the rightward roll attitude of the UAV. Merely by way of example, the motor speed parameters $$\Omega_1^2, \Omega_2^2, \Omega_3^2, \text{ and } \Omega_4^2$$

of each motor may be solved based on the expression $$U_2 = C_T(\Omega_1^2 + \Omega_4^2 - \Omega_2^2 - \Omega_3^2)$$

for the roll torque $U_2$ in Equation (1). It should be noted that this is only an example. The actual generation and/or adjustment of the motor speed parameter needs to consider practical requirements. For example, if the pitch attitude is required simultaneously with the roll attitude, the coordinated effect of the roll torque $U_2$ and the pitch torque $U_3$ is considered.

In some embodiments, in response to determining that a real-time system overshoot and a flight speed satisfy a speed adjustment condition, a speed adjustment instruction may be determined and sent to the motor to adjust an operation parameter of the motor, the operation parameter including the motor speed parameter.

The real-time system overshoot refers to a magnitude by which the UAV exceeds the expected attitude or the steady state value during each attitude adjustment, which may be used to evaluate the accuracy of the attitude adjustment of the UAV and the duration for the UAV to reach the steady state. The greater the real-time system overshoot, the more adjustments may be required, or the higher the probability of a high duration for the UAV to reach the steady state.

The speed adjustment condition refers to a condition that the flight speed of the UAV needs to be adjusted, which may be various conditions preset according to the actual needs. The speed adjustment of the UAV may be realized based on the control of the operation parameter (e.g., the motor speed parameter) of the motor. For example, the UAV control system may reduce the motor speed of the motor through the speed adjustment instruction to decrease the flight speed.

In some embodiments, the speed adjustment condition may include that the real-time system overshoot is greater than a second overshoot threshold and the flight speed is greater than a first speed threshold, or any combination thereof. The first speed threshold may be determined based on the flight influence factor.

The flight influence factor refers to various factors that negatively impact the safety flight of the UAV, such as the strong winds, dense regions of obstacles, etc. In some embodiments, the first speed threshold may be related to the flight influence factor. The UAV control system may preset a safety index of a plurality of different flight influence factors for the safety flight of the UAV, and set the first speed threshold based on the safety index.

In some embodiments, the UAV control system may set different a mapping relationship (e.g., a data table) between different flight influence factors and the safety indices based on historical experience. For example, the safety index corresponding to the strong winds may be set lower. In some embodiments, the safety index may be positively correlated with the first speed threshold. For example, the lower the safety index, the smaller the corresponding first speed threshold may be set. Merely by way of example, the strong winds may cause fatal damage to the UAV, indicating a low safety index, so that the first speed threshold may be set low or even grounded (i.e., the first speed threshold is set to 0).

The second overshoot threshold may be the same as the first overshoot threshold. In some embodiments, the second overshoot threshold may be positively correlated with the safety index. For example, the lower the safety index, the lower the second overshoot threshold may be set. It is understood that the higher the real-time system overshoot and the longer the duration for the UAV to reach the steady state, the easier it is for the UAV to cause the oscillation, and it is more likely to cause a safety hazard. For example, when the safety index is low (e.g., due to the flight influence factor such as sudden strong winds), the speed adjustment needs to be triggered in time (e.g., significantly reducing the flight speed in time), and setting a lower second overshoot threshold makes it easier to trigger the speed adjustment instruction, so as to enhance the fault tolerance of safety flight, and avoid safety accidents caused by untimely adjustment.

In some embodiments of the present disclosure, by monitoring the real-time system overshoot, setting the second overshoot threshold, and the dynamic adjustment of the first speed threshold, adaptive adjustment of the speed of the UAV can be achieved, thereby improving the flight stability and safety.

S5, adjusting a motor speed of the quadrotor UAV based on the motor speed parameter.

In some embodiments, the UAV control system may generate an adjustment instruction (e.g., an electronic speed controller (ESC) signal) for the motor speed based on the motor speed parameter to adjust the motor speed of the quadrotor UAV. The adjustment instruction may be the ESC signal to drive mechanical rotation of the motor.

It should be noted that the foregoing description is intended to be exemplary and illustrative only and does not limit the application scope of the present disclosure. For a person skilled in the art, various improvements and modifications can be made without departing from the principles of the present disclosure. These improvements and modifications should also be regarded as the scope of protection of the present disclosure. Structures, apparatuses, and methods of operation that are not specifically described and explained in the present disclosure are implemented in accordance with the conventional means in the art, if not otherwise specified and limited.

What is claimed is:
1. A method for attitude control of a quadrotor unmanned aerial vehicle (UAV), wherein the method is performed by a UAV control system; the UAV control system includes a UAV body, a plurality of sensors disposed on the quadrotor UAV, a processing device, and a controller; the method comprising:
S1, establishing an attitude dynamics model of the quadrotor UAV;
S2, establishing a motion equation and a state-space equation of the UAV control system, and determining a linear active disturbance rejection controller with a compensation function observer (LADRC-CFO);
S3, establishing a differential tracker for reducing a system overshoot;
S4, after obtaining an actual control input u, which is an output value $u_0$ of a PD controller compensated for disturbance through the LADRC-CFO and the differential tracker, obtaining a motor speed parameter using the attitude dynamics model of the quadrotor UAV based on expected attitude of the quadrotor UAV and an distribution of motors;
S5, generating an adjustment instruction for a motor speed based on the motor speed parameter to adjust a motor speed of the quadrotor UAV, wherein the adjustment instruction includes an electronic speed controller (ESC) signal to drive mechanical rotation of a motor;
the method further comprising:
obtaining attitude data based on an attitude sensor, the attitude sensor including at least one of a gyroscope and an accelerometer;
obtaining an actual system overshoot based on the attitude data;
in response to determining that the actual system overshoot does not satisfy a steady state condition,
obtaining candidate control parameters, the candidate control parameters including a candidate first parameter and a candidate second parameter;
determining, based on the candidate control parameters, environmental monitoring data, and flight mission information, a control score for each of the candidate control parameters through a control prediction model;
wherein
the control prediction model is a trained machine learning model,
an input of the control prediction model includes the candidate control parameters, the environmental monitoring data, and the flight mission information,
an output of the control prediction model includes the control score for the each of the candidate control parameters,
the control prediction model is obtained by training based on a training sample set,
the training sample set includes a plurality of sets of training samples and labels corresponding the training samples,
each set of the plurality of sets of training samples includes sample candidate control parameters, sample environmental monitoring data, and sample flight mission information,
each of the labels corresponding the training samples is an actual control score corresponding to one set of the plurality of sets of training samples, and the training based on the training sample set includes:
  determining a value of a loss function based on a difference between an output of an initial model and the labels corresponding the training samples, and
  updating parameters of the initial model iteratively based on the value of the loss function until a training termination condition is met, and determining an updated initial model as the control prediction model;
obtaining a target first model parameter and a target second model parameter by updating a first model parameter and a second model parameter based on the control score; wherein the first model parameter includes a gain $L_1$ and a gain $L_2$ of CFO, and controller parameters $k_p$ and $k_d$ of the PD controller, and the second model parameter includes a speed factor g and a sampling period T;
wherein the updating the first model parameter and the second model parameter based on the control score includes:
  determining the first model parameter and the second model parameter included in the candidate control parameters with a highest control score as an updated first model parameter and an updated second model parameter;
determining a flight influence factor based on the sample environmental monitoring data and the sample flight mission information;
determining a preset count threshold based on the flight influence factor; and
in response to determining that a count of consecutive updates of the first model parameter and the second model parameter is greater than the preset count threshold, generating a flight termination instruction and transmitting the flight termination instruction to the motor to execute a grounding operation of the quadrotor UAV;
where in the S1, the attitude dynamics model of the quadrotor UAV is expressed as:

$$\begin{bmatrix} U_1 \\ U_2 \\ U_3 \\ U_4 \end{bmatrix} = \begin{bmatrix} C_T \sum_{i=1}^{4} \Omega_i^2 \\ C_T(\Omega_1^2 + \Omega_4^2 - \Omega_2^2 - \Omega_3^2) \\ C_T(\Omega_3^2 + \Omega_4^2 - \Omega_1^2 - \Omega_2^2) \\ C_M(\Omega_2^2 + \Omega_4^2 - \Omega_3^2 - \Omega_1^2) \end{bmatrix} \quad (1)$$

where $C_T$ is a lift coefficient, $C_M$ is a drag coefficient, $U_1$ is a total lift T from a propeller driven by the motor, and $U_2$, $U_3$ and $U_4$ are torques of an x-axis, a y-axis, and a z-axis;
$\Omega_i^2$ is a motor speed of each motor, i=1, 2, 3, 4;
according to Newton-Euler Equations, the attitude dynamics model of the quadrotor UAV is expressed as:

$$\begin{cases} \ddot{\phi} = \dot{\theta}\dot{\psi}\frac{I_y - I_z}{I_x} + \frac{lC_T U_2}{I_x} - \frac{k_x\dot{\phi}}{I_x} - \frac{I_R}{I_x}\dot{\theta}(-\Omega_1 - \Omega_2 + \Omega_3 + \Omega_4) \\ \ddot{\theta} = \dot{\phi}\dot{\psi}\frac{I_z - I_x}{I_y} + \frac{lC_T U_3}{I_y} - \frac{k_y\dot{\theta}}{I_y} - \frac{I_R}{I_y}\dot{\theta}(-\Omega_1 - \Omega_2 + \Omega_3 + \Omega_4) \\ \ddot{\psi} = \dot{\phi}\dot{\theta}\frac{I_x - I_y}{I_z} + \frac{lC_T U_4}{I_z} - \frac{k_z\dot{\psi}}{I_z} \end{cases} \quad (2)$$

where l is a distance from a body center of mass to a motor rotor, $I_R$ is a combined inertia torque of the motor rotor and the motor, $k=[k_x,k_y,k_z]^T$ is a aerodynamic drag coefficient, and $\phi$, $\theta$, $\psi$ are a roll angle, a pitch angle, and a yaw angle, respectively, $\dot{\phi}$, $\dot{\theta}$, $\dot{\psi}$ are angular velocities of a body frame about the x-axis, the y-axis, and the z-axis, respectively, $\ddot{\phi}$, $\ddot{\theta}$, $\ddot{\psi}$ are angular accelerations of the body frame about the x-axis, the y-axis, and the z-axis, respectively, $I_x$, $I_y$, $I_z$ are moments of inertia about an xx-axis, a yy-axis, and a zz-axis of the body frame, respectively;
categorizing strong coupling effects as internal disturbances $x_i$, =1, 2, 3;
the attitude dynamics model is expressed as:

$$\begin{cases} \ddot{\phi} = \frac{lC_T U_2}{I_x} - \frac{k_x\dot{\phi}}{I_x} + x_1 \\ \ddot{\theta} = \frac{lC_T U_3}{I_y} - \frac{k_y\dot{\theta}}{I_y} + x_2 \\ \ddot{\psi} = \frac{lC_T U_4}{I_z} - \frac{k_z\dot{\theta}}{I_z} + x_2 \end{cases} \quad (3)$$

where, $$\begin{cases} x_1 = \frac{I_R}{I_x}\dot{\theta}(-\Omega_1 - \Omega_2 + \Omega_3 + \Omega_4) - \dot{\theta}\dot{\psi}\frac{I_y - I_z}{I_x} \\ x_2 = \frac{I_R}{I_x}\dot{\theta}(-\Omega_1 - \Omega_2 + \Omega_3 + \Omega_4) - \dot{\theta}\dot{\psi}\frac{I_y - I_z}{I_x} \\ x_3 = \dot{\phi}\dot{\theta}\frac{I_y - I_x}{I_z} \end{cases} \quad (31)$$

modifying the attitude dynamics model as follows based on external disturbances:

$$\begin{cases} \ddot{\phi} = \frac{lC_T U_2}{I_x} - \frac{k_x\dot{\phi}}{I_x} + f_1 \\ \ddot{\theta} = \frac{lC_T U_3}{I_y} - \frac{k_y\dot{\theta}}{I_y} + f_2 \\ \ddot{\psi} = \frac{lC_T U_4}{I_z} - \frac{k_z\dot{\psi}}{I_z} + f_3 \end{cases} \quad (4)$$

where $f_i = \varepsilon_i + d_i$, (i=1,2,3), and $d_i$ are unknown or unmeasurable disturbances;
in the S2, an attitude dynamics equation of the quadrotor UAV is expressed as follows based on Equation (4):

$$\ddot{y} = a\dot{y} + bu + d \quad (5)$$

where y is denoted as an output of a system, u is an input of the system, d is denoted as the unknown or unmeasurable disturbances of the system, a is denoted as a parameter of the system, and b is a control gain of a second order control system;
by treating $a\dot{y}+d$ as a total disturbance $f$ of the system, Equation (5) is expressed as:

$$\ddot{y} = bu + f \quad (6)$$

let $x_1 = y$, $x_2 = \dot{y}$, the attitude dynamics equation of the system is expressed as follows based on Equation (6):

$$\begin{cases} \dot{x}_1 = x_2 \\ \dot{x}_2 = bu + f \end{cases} \quad (7)$$

the compensation function observer adopting a compensation function in a derivative form is configured to address a non-derivative form limitation of a linear extended state observer, according to Equation (7):

$$\begin{cases} \dot{z}_1 = z_2 \\ \dot{z}_2 = L_1 e_1 + L_2 e_2 + bu \\ \hat{f} = \dot{z}_2 - bu = L_1 e_1 + L_2 e_2 \end{cases} \quad (8)$$

where $e_1 = x_1 - z_1$, $e_2 = x_2 - z_2$; $z_1$, $z_2$, and $\hat{f}$ are estimates of $x_1$, $x_2$, and $f$, respectively; $L_1$ and $L_2$ are gains of the compensation function observer;

let Equation (7) subtract Equation (8) to obtain:

$$\begin{cases} \dot{e}_1 = e_2 \\ \dot{e}_2 = -(L_1 e_1 + L_2 e_2) + f \end{cases} \quad (9)$$

according to Equation (9), a pure differential relationship between $e_1$ and $e_2$ is established and an estimation error $(e_1, e_2)$ is related to the total disturbance $f$, a compensation function $\tilde{f}$ is introduced for mitigating an effect of the total disturbance $f$ on the estimation error:

$$\begin{cases} \dot{z}_1 = z_2 \\ \dot{z}_2 = L_1 e_1 + L_2 e_2 + \tilde{f} + bu \\ \hat{f} = L_1 e_1 + L_2 e_2 + \tilde{f} \end{cases} \quad (10)$$

by subtracting Equation (10) from Equation (7), an observation error with the compensation function $\tilde{f}$ is obtained:

$$\begin{cases} \dot{e}_1 = e_2 \\ \dot{e}_2 = -(L_2 e_1 + L_2 e_2) + (f - \tilde{f}) \end{cases} \quad (11)$$

in response to determining that the compensation function $\tilde{f}$ approaches the total disturbance $f$, the estimation error is significantly decreased;

coupling two variables using a low-pass filter to obtain:

$$\tilde{f} = \frac{\lambda}{s + \lambda} \hat{f} \quad (12)$$

where $\lambda = 2\pi f_c$, and $f_c$ denotes a cutoff frequency of the low-pass filter;

thus, the compensation function observer is expressed as:

$$\begin{cases} \dot{z}_1 = z_2 \\ \dot{z}_2 = L_1 e_1 = L_2 e_2 + \tilde{f} + bu \\ \hat{f} = L_1 e_1 + L_2 e_2 + \tilde{f} \\ \tilde{f} = \frac{\lambda}{s + \lambda} \hat{f} \end{cases} \quad (13)$$

let $z_3 = \tilde{f}$, simplifying Equation (13) to:

$$\begin{cases} \dot{z}_1 = z_2 \\ \dot{z}_2 = L_1 e_1 = L_2 e_2 + z_3 + bu \\ \dot{z}_3 = \lambda(L_1 e_1 + L_2 e_2) \\ \hat{f} = L_1 e_1 + L_2 e_2 + z_3 \end{cases} \quad (14)$$

wherein $\hat{f}$ denotes a compensated disturbance estimate;

a characteristic equation of the compensation function observer is derived as follows based on Equation (14):

$$s^3 + L_1 s^2 + (\lambda L_1 + L_2) s + \lambda L_2 = 0 \quad (15).$$

2. The method of claim 1, wherein from Equation (15), the compensation function observer is stable when all roots of the characteristic equation lie in a left half plane, and a control quantity u is designed as follows based on the compensation function observer and the PD controller:

$$\begin{cases} u_0 = k_p(u_d - z_1) - k_d(\dot{u}_d - z_2) + \ddot{u}_d \\ u = \dfrac{u_0 - \hat{f}}{b} \end{cases} \quad (16)$$

wherein $u_d$ is an expected input, and $k_p$, and $k_d$ are controller parameters of the PD controller.

3. The method of claim 1, further comprising:

in response to determining that a real-time system overshoot and a flight speed of the quadrotor UAV satisfy a speed adjustment condition, determining a speed adjustment instruction and sending the speed adjustment instruction to the motor to adjust an operation parameter of the motor, wherein the operation parameter includes the motor speed parameter;

the speed adjustment condition refers to a condition that requires adjusting the flight speed of the quadrotor UAV, including at least one of the following:

the flight speed of the quadrotor UAV being greater than a first speed threshold, and the real-time system overshoot being greater than a second overshoot threshold;

wherein the first speed threshold is determined based on the flight influence factor.

4. The method of claim 1, wherein a training of the control prediction model is a phased training, wherein the phased training includes a first training phase, a second training phase, and a third training phase, a training sample set corresponding to the first training phase, a training sample set corresponding to the second training phase, and a training sample set corresponding to the third training phase are different from each other, and the phased training is related to a mission difficulty corresponding to a sample flight mission, and the mission difficulty corresponding to a flight mission reflects a degree of difficulty in completing the flight mission.

5. The method of claim 4, further comprising:

obtaining a plurality of historical flight missions;

grouping the plurality of historical flight missions to obtain a low difficulty mission group, a medium difficulty mission group, and a high difficulty mission group;

constructing a first training sample set for the first training phase, a second training sample set for the second training phase, and a third training sample set for the third training phase based on historical data of the low difficulty mission group, the medium difficulty mission group, and the high difficulty mission group, respectively, and performing an iterative training based on the first training sample set, the second training sample set, and the third training sample set in turn.

6. The method of claim 5, further comprising:
setting a first learning rate, a second learning rate, and a third learning rate corresponding to the first training phase, the second training phase, and the third training phase, respectively, wherein
the first learning rate, the second learning rate, and the third learning rate increase in sequence.

7. The method of claim 6, wherein the phased training further includes:
in the first training phase, training an initial control prediction model based on the first training sample set to obtain a first control prediction model;
in the second training phase, training the first control prediction model obtained in the first training phase based on the second training sample set to obtain a second control prediction model; and
in the third training phase, training the second control prediction model obtained in the second training phase based on the third training sample set to obtain a trained control prediction model.

8. The method of claim 1, wherein the updating the first model parameter and the second model parameter includes:
updating the gain $L_1$ of the CFO in the first model parameter to adjust a tracking speed of the CFO for a disturbance error;
updating the gain $L_2$ of the CFO in the first model parameter to adjust a dynamic response capability of the CFO for the compensated disturbance estimate;
updating the controller parameter $k_p$ to adjust a response speed to an attitude error;
updating the controller parameter $k_d$ to adjust a variation rate of the attitude error; and
updating the speed factor g and the sampling period T in the second model parameter to optimize the differential tracker.

9. The method of claim 1, further comprising:
in response to determining that the count of consecutive updates of the first model parameter and the second model parameter is greater than the preset count threshold, issuing a warning and instructing the quadrotor UAV to fly to a nearest maintenance point.

* * * * *